(12) United States Patent
Palese

(10) Patent No.: US 7,481,388 B2
(45) Date of Patent: Jan. 27, 2009

(54) MOUNTING ARRANGEMENT FOR AN APPLIANCE

(75) Inventor: Jeffrey W. Palese, North Ridgeville, OH (US)

(73) Assignee: Pragotrade U.S.A. Incorporated, Cleveland, OH (US)

( * ) Notice: Subject to any disclaimer, the term of this patent is extended or adjusted under 35 U.S.C. 154(b) by 728 days.

(21) Appl. No.: 10/446,368

(22) Filed: May 28, 2003

(65) Prior Publication Data

US 2004/0237803 A1 Dec. 2, 2004

(51) Int. Cl.
*A47J 17/00* (2006.01)
*A47J 43/00* (2006.01)

(52) U.S. Cl. .............. 241/168; 241/169.1; 241/282.1

(58) Field of Classification Search .............. 248/205.5, 248/229.15, 229.25, 231.17; 241/168, 169.1, 241/282.1
See application file for complete search history.

(56) References Cited

U.S. PATENT DOCUMENTS

| | | | |
|---|---|---|---|
| 1,444,975 A | | 2/1923 | Maine |
| 1,698,860 A | * | 1/1929 | Ulrich .......................... 99/505 |
| 1,840,400 A | * | 1/1932 | Lebherz ...................... 248/362 |
| 2,145,421 A | * | 1/1939 | Jungbecker .............. 425/302.1 |
| 3,276,734 A | * | 10/1966 | Goldblatt .................. 248/176.1 |
| 3,288,415 A | * | 11/1966 | Eickhoff ................. 248/231.71 |
| 3,424,419 A | * | 1/1969 | Siegel .................... 248/231.71 |
| 3,489,383 A | * | 1/1970 | Anson .................... 248/231.71 |
| 3,591,118 A | * | 7/1971 | Gentile et al. .......... 248/231.71 |
| D224,179 S | | 7/1972 | Taylor |
| 3,747,170 A | | 7/1973 | Kieves |
| 3,765,638 A | | 10/1973 | Harrison |
| 3,770,259 A | | 11/1973 | Wagreich |
| 3,946,992 A | * | 3/1976 | Elias ............................ 256/58 |
| 3,964,345 A | * | 6/1976 | Le Van ...................... 74/665 P |
| 4,081,145 A | | 3/1978 | Moe et al. |
| 4,180,229 A | | 12/1979 | Schulein |
| 4,441,410 A | | 4/1984 | Thompson |
| 4,457,503 A | | 7/1984 | Connor |
| 5,156,364 A | * | 10/1992 | Hoffmann .................. 248/48.2 |
| 5,485,988 A | | 1/1996 | Nobilec |
| 5,820,116 A | | 10/1998 | Haese |
| 5,970,860 A | | 10/1999 | Yip |
| D465,966 S | | 11/2002 | Daftari |

* cited by examiner

*Primary Examiner*—Bena Miller
(74) *Attorney, Agent, or Firm*—Tarolli, Sundheim, Covell & Tummino LLP

(57) ABSTRACT

A kitchen appliance apparatus (10) mountable on a work surface (12) for performing a culinary function includes a culinary unit (14) and a base (16) for the culinary unit. The apparatus (10) includes a suction assembly (48) that includes a suction member (50) that forms a bottom surface of the base (16). The suction assembly (48) is operable to form a vacuum between the suction member (50) and the work surface (12) that releasably connects the base (16) to the work surface. A clamp assembly (100) includes a clamping member (112) that has a clamping surface spaced from and presented toward the suction member (50). The clamping member (112) is movable toward the suction member (50) to clamp the work surface (12) between the clamping member and the suction member.

6 Claims, 2 Drawing Sheets

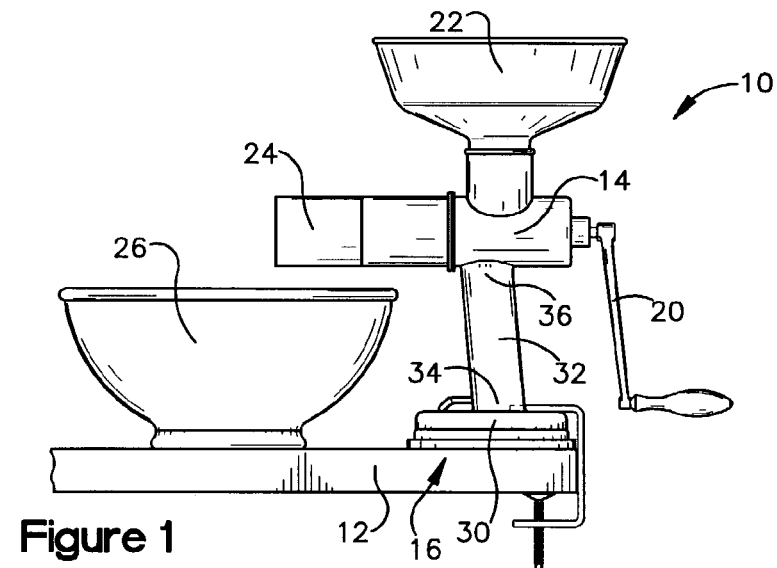
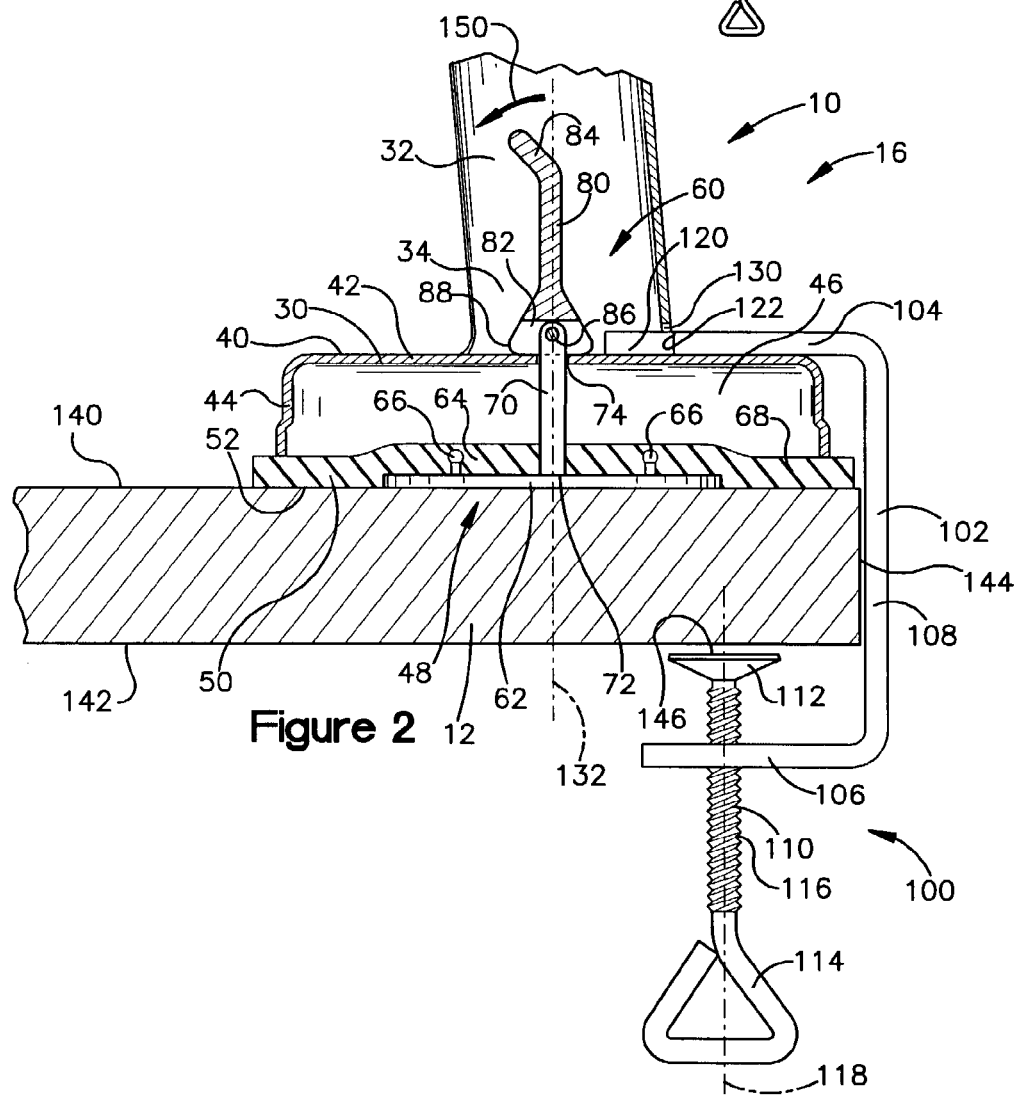

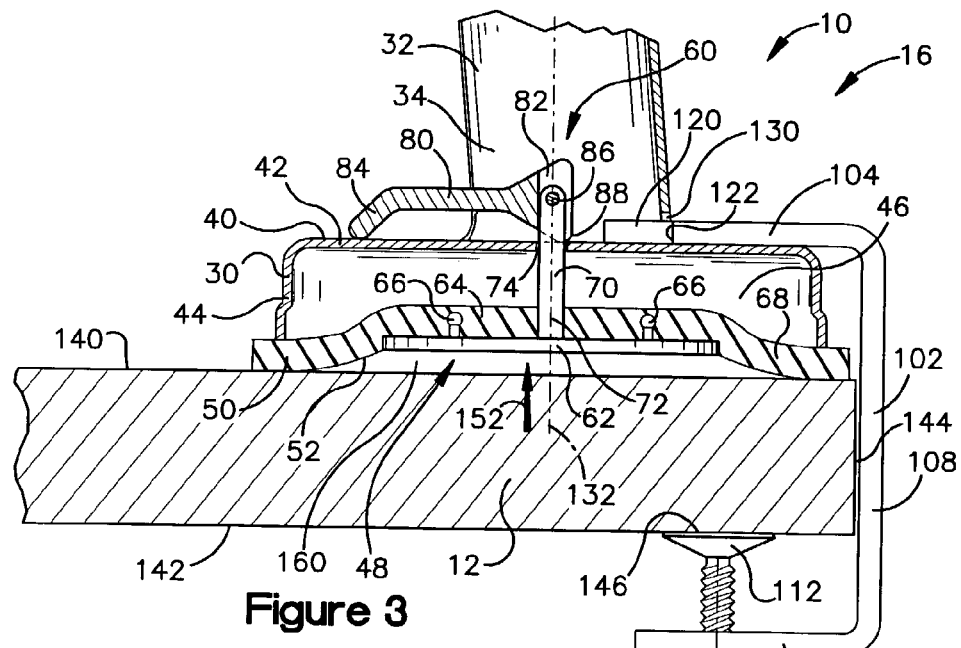

US 7,481,388 B2

MOUNTING ARRANGEMENT FOR AN APPLIANCE

FIELD OF THE INVENTION

The present invention relates to an appliance that may be used in a residential or commercial kitchen setting to perform a culinary function. More particularly, the present invention relates to a versatile mounting arrangement adapted to help to secure a kitchen appliance to a variety of work surfaces.

BACKGROUND OF THE INVENTION

Appliances for use in residential and commercial kitchen settings are widely known and perform a variety of culinary functions. For example, known food processing appliances, sometimes referred to as "food processors," are used to perform a variety of culinary functions, such as mixing, grinding, chopping, slicing, grating, juicing, and straining. Other known kitchen appliances, such as can openers and knife sharpeners, perform culinary functions that are kitchen related, but may be somewhat indirectly related to the preparation of food. Some kitchen appliances can range in size from small personal or home use devices to large floor-standing commercial or industrial devices.

Many kitchen appliances are designed to be somewhat portable in nature. As a result, many kitchen appliances are designed for use on a work surface such as a table or countertop. These kitchen appliances may be powered manually, such as via crank or handle, or may be powered by an electric motor.

SUMMARY OF THE INVENTION

According to one aspect of the invention, the present invention relates generally to an apparatus for mounting an appliance on a work surface. The apparatus includes a suction assembly for forming a vacuum that mounts the appliance to the work surface. The apparatus also includes a clamp assembly for simultaneously clamping the appliance to the work surface.

The present invention also relates to a kitchen appliance apparatus for performing a culinary function that is mountable on a work surface. The apparatus includes a culinary unit and a base for the culinary unit. The apparatus also includes a suction assembly that includes a suction member that forms a bottom surface of the base. The suction assembly is operable to form a vacuum between the suction member and the work surface that releasably connects the base to the work surface. A clamp assembly includes a clamping member that has a clamping surface spaced from and presented toward the suction member. The clamping member is movable toward the suction member to clamp the work surface between the clamping member and the suction member.

The present invention further relates to an apparatus, mountable on a work surface, for performing a culinary function. The apparatus includes means for performing the culinary function. The apparatus also includes means for forming a vacuum for releasably connecting the culinary means to the work surface. The apparatus further includes means for clamping the culinary means to the work surface.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 1 is a schematic illustration of a kitchen appliance apparatus including an adjustable mounting arrangement, according to the present invention.

FIG. 2 is a sectional view a portion of the apparatus of FIG. 1 illustrating parts in certain positions.

FIG. 3 is a sectional view a portion of the apparatus of FIG. 1 illustrating parts in different positions.

FIG. 4 is a perspective view of the portion of the apparatus of FIG. 3.

DETAILED DESCRIPTION OF THE INVENTION

Referring to FIG. 1, the present invention relates to a kitchen appliance apparatus 10, also referred to herein as a "kitchen appliance" or "appliance". The kitchen appliance 10 may perform a variety of culinary functions. For example, the appliance 10 could perform food processing functions, such as food grinding, cutting, chopping, grating, peeling, straining, juicing, etc. The appliance 10 could also perform culinary functions somewhat indirectly related to food preparation or processing, such as can opening or knife sharpening. The appliance 10 illustrated in FIG. 1 is a food processing device intended for juicing and/or straining vegetables, such as a tomato strainer.

The appliance 10 is mountable on a work surface 12, such as a tabletop or countertop. The appliance 10 includes a portion or unit for performing a culinary function 14, referred to herein as a "culinary unit." In the example embodiment, the culinary unit 14 performs tomato juicing/straining functions. The appliance 10 also includes a base 16 for supporting the culinary unit 14 on the work surface 12. In the illustrated embodiment, the appliance 10 is configured for manual operation via a hand crank 20. The appliance 10 could, however, be an automated unit powered by means (not shown) such as an electric motor.

In the example embodiment, the culinary unit 14 includes an input portion 22 for receiving food items (not shown) and an output portion 24 for discharging the processed food items from the unit. For example, food items may be received in the input portion 22, processed in the culinary unit 14, and discharged through the output portion 24 into a suitable receptacle 26, such as a bowl.

According to the present invention, the base 16 provides a means by which to mount the appliance 10 to the work surface 12. Referring to FIGS. 1-4, the base 16 includes a base portion 30 and a support portion 32. The support portion 32 has a first end portion 34 connected with the base portion 30 and a second end portion 36 (FIG. 1) connected with the culinary unit 14. The support portion 32 projects in a generally upward direction (e.g., away) from an upper surface 40 of a top wall portion 42 of the base portion 30, as viewed in FIGS. 1-4. Those skilled in the art will appreciate that the base 16 could have alternative configurations. For example, the support portion 32 could be omitted and the culinary unit 14 could be directly connected to or formed integral with the base.

The base portion 30 also includes a rim portion 44 that projects downward from the top wall portion 42. The rim portion 44 together with the top wall portion 42 form a recess 46 of the base portion 30. In the illustrated embodiment, the base portion 30 has a generally cylindrical configuration. The base portion 30 could, however, have an alternative configuration, such as a square, elliptical or rectangular configuration.

The appliance 10 includes a suction assembly 48 for helping to fixedly mount the appliance to the work surface 12. The suction assembly 48 includes a suction member 50, which forms a bottom surface 52 of the base 16. The suction member 50 is constructed of flexible material, such as rubber, plastic, or any other material that exhibits elastomeric properties. The suction member 50 spans across (e.g., covers) the recess 46. In the illustrated embodiment, the suction member 50 has a circular or disc-shaped configuration with a diameter slightly larger than the diameter of the rim portion 44. The suction member 50 thus may extend beyond the rim portion 44, as best shown in FIGS. 2-4. The suction member 50 could, however, have an alternative shape, such as a shape for covering a base 16 having a non-cylindrical configuration (e.g., square, elliptical, or rectancular).

Referring to FIGS. 2-4, the suction assembly 48 also includes an actuator assembly 60 which, upon actuation, is operative to urge the suction member 50 into the recess 46. In the illustrated example, the actuator assembly 60 includes a disc-shaped lift member 62 that underlies a central portion 64 of the suction member 50 on the bottom surface 52 of the base 16. The lift member 62 may be connected to the suction member 50 by means such as an adhesive or by projections 66 that project into the suction member. The lift member 62 leaves an annular portion 68 of the suction member 50 circumscribing the lift member exposed.

The actuator assembly 60 also includes a lift rod 70 that has a first end 72 connected with the lift member 62. The lift rod 70 extends through the suction member 50, into the recess 46 in the base portion 30, and through an aperture 74 in the top wall portion 42 of the base portion. The aperture 74 extends through the top wall portion 42 and through the upper surface 40 of the top wall portion.

The actuator assembly 60 also includes an actuator 80 that includes a cam portion 82 and a lever portion 84. The cam portion 82 is connected with a second end 86 of the lift rod, opposite the first end 72 of the rod. In the illustrated embodiment, the cam portion 82 has a generally triangular configuration and has an outer cam surface 88. The cam portion 82 could have an alternative configuration, such as an eccentric wheel shape or wheel shape having multiple curves.

The appliance 10 also includes a clamp assembly 100 for mounting the appliance to the work surface 12. The clamp assembly 100 is adapted for connection with the base 16. The clamp assembly 100 is removable from the base 16, as illustrated in dashed lines in FIG. 4.

The clamp assembly 100 includes a bracket 102 that has a generally C-shaped configuration. The bracket 102 includes an upper bracket member 104 and a lower bracket member 106 that are spaced apart from each other and extend generally parallel to each other. A support member 108 extends between and connects the upper and lower bracket members 104 and 106.

The clamp assembly 100 also includes a screw member 110 that extends through the lower bracket member 106. The screw member 110 has a first end connected with a clamping member 112 of the clamp assembly 100. The screw member 110 also has an opposite second end including a handle or gripping portion 114. In the illustrated embodiment, the second end of the screw member 110 is bent to form a gripping portion 114 having a generally triangular configuration. The gripping portion 114 could, however, have an alternative shape or could be a separate piece connected to the screw member 110.

The screw member 110 extends through an aperture (not shown) in the lower bracket member 106. The screw member 110 includes a series of screw threads 116 that cooperate with screw threads (not shown) of the aperture in the lower bracket member 106. The screw member 110 is rotatable about an axis 118 to effectuate axial movement of the screw member and the clamping member 112 relative to the bracket 102 along this axis.

The upper bracket member 104 has a terminal end formed as a tab 120. The tab 20 has a width that is narrowed from the remainder of the upper bracket member 104. The tab 120, having this narrowed configuration, helps define shoulder surfaces 122 on the upper bracket member 104 positioned on opposite sides of the tab.

In the example of FIGS. 1-4, the first end 34 of the support member 32 includes an opening 130 positioned adjacent or near the intersection of the support member and the base portion 30. The opening 130 has a generally rectangular slotted configuration and has a width that is slightly larger than the width of the tab 120 on the upper bracket member 104 of the clamp assembly 100. The opening 130 is adapted to receive the tab 120 to help support the upper bracket member 104 and, thus, the clamp assembly 100 on the base 16 of the appliance 10.

Those skilled in the art will understand and appreciate other approaches to interface the clamp assembly 100 with another part of the apparatus 10. For example, a suitable opening could be formed in the base 16. Alternatively or additionally, a channel or groove could be formed in the top wall portion 42 of the base configured to receive the upper bracket member 104. As a further alternative, the tab 120 may be omitted and the opening 130 may be adapted to receive the entire width of the upper bracket member 104.

When the tab 120 is inserted into the opening 130 as shown in FIGS. 2-4, the shoulder surfaces 122 engage portions of the support member 32 positioned on opposite lateral sides of the opening 130. The opening 130, having a width slightly wider than the width of the tab 120, may thus form a close fit with the tab.

According to the present invention, the appliance 10 can be mounted to the work surface 12 via the suction assembly 48, via the clamp assembly 100, or via both the suction assembly and the clamp assembly. For purposes of illustration, the appliance 10 is illustrated in FIGS. 1-4 as being mounted to the work surface 12 by both the suction assembly 48 and the clamp assembly 100.

Referring to FIG. 2, the appliance 10 is illustrated positioned on the work surface 12 prior to application of the suction assembly 48 and the clamp assembly 100. In FIG. 2, the appliance 10 is not fixedly connected to the work surface 12 and is thus free to move or be moved on the work surface.

In the unactuated condition of the suction assembly 48 illustrated in FIG. 2, the actuator 80 is in an unactuated condition in which the lever portion 84 extends generally vertically (i.e., away) from the upper surface 40 of the top wall 42. In the unactuated condition, the lift member 62 is positioned adjacent or touching an upper surface 140 of the work surface 12. The annular portion 68 of the suction member 50 rests on the upper surface 140.

In the unactuated condition of the clamp assembly 100 illustrated in FIG. 2, the screw member 110 is loosened or unscrewed such that the clamping member 112 is spaced away from a lower surface 142 of the work surface 12, opposite the upper surface 140. A clamping surface 146 of the clamping member 112 is presented facing the lower surface 142. The tab 122 of the upper bracket member 104 is inserted into the opening 130 and the shoulder surfaces 122 engage portions of the support member 32 positioned on opposite lateral sides of the opening. The remainder of the upper bracket 104 rests on the upper surface 40 of the top wall portion 42 of the base portion 30.

The suction assembly 48 is placed in the actuated condition by operating the lever portion 84 of the actuator 80 manually to impart pivotal movement of the actuator in the direction indicated generally by the curved arrow indicated at 150 in FIG. 2. This places the suction assembly 48 in the actuated condition illustrated in FIG. 3.

As shown on FIG. 3, when the actuator 80 pivots to the actuated condition, the cam surface 88 of the cam portion 86 slides or otherwise rides on the upper surface 40 of the top wall portion 42 of the base portion 30. As a result, the cam portion 86 pulls or otherwise exerts a force on the lift rod 70, which causes the lift rod, and thus the lift member 62, to move in a generally upward direction along an axis 132 away from the upper surface 140, as indicated the arrow at 152 in FIG. 3.

The lift member 62, when pulled in the upward direction 152 in response to operation of the actuator 80, pulls the central portion 64 of the suction member 50 in the same upward direction. This causes the central portion 64 and some of the annular portion 68 to be pulled away from the upper surface 140 of the work surface 12. At the same time, at least a substantial portion the annular portion 68 remains in contact with the upper surface 140 of the work surface 12. Manual force may be applied to the appliance 10 to maintain the annular portion 68 in engagement with the upper surface 140 while the actuator 80 is operated to place the suction assembly 48 in the actuated condition.

A chamber 160 is formed between the suction member 50 and the upper surface 140 of the work surface 12 when the suction assembly 48 is placed in the actuated condition. The annular portion 68, remaining engaged with the upper surface 140, forms a seal with the work surface 12 that inhibits ambient air from being drawn into the chamber 160. As a result, a vacuum is formed in the chamber 160 when the suction assembly 48 is in the actuated condition. By "vacuum," it is meant that a region of low pressure in comparison with the atmospheric pressure of ambient surroundings is formed in the chamber 160. This low pressure region creates a suction force that helps mount the appliance 10 to the work surface 12.

Those skilled in the art will appreciate that the ability of the suction assembly 48 to help mount the appliance 10 to the work surface 12 depends on the ability of the annular portion 68 of the suction member 50 to form a seal with the work surface. It will also be appreciated that some work surfaces, such as work surfaces constructed of porous wood or tiled work surfaces having recessed joints between adjacent tiles, may not be capable of achieving or maintaining this requisite seal. It may therefore be desirable to provide alternative means by which to mount the appliance 10 to the work surface 12. It will further be appreciated that it may be desirable to supplement or enhance the force by which the appliance 10 is mounted to the work surface 12 by the suction assembly 48.

According to the present invention, the clamp assembly 100 may be used in addition to the suction assembly 48 to supplement or enhance the force by which the appliance 10 is mounted to the work surface 12. This is shown in FIG. 3. This may be desirable, for example, in the event that the work surface 12 becomes wet or damp, which may cause the suction member 50, and thus the appliance 10, to slip or slide on the work surface. This also may be desirable in a situation where vigorous use of the appliance 10 may tend to dislodge the suction mount provided by the suction assembly 48.

Also, according to the present invention, the clamp assembly 100 may also be used by itself to mount the appliance 10 to the work surface 12. This may be desirable, for example, in the event that the construction of the work surface 12 renders establishing or maintaining a seal between the work surface and the suction member 50 difficult or impossible.

The clamp assembly 100 is placed in the actuated condition by rotating the screw member 110 about the axis 118 to effectuate movement of the clamp member 112 toward the lower surface 142 of the work surface 12. This may be accomplished, for example, by rotating the screw member 110 manually via the gripping portion 114. As the screw member 110 is rotated, the clamping surface 146 of the clamping member 112 eventually engages the lower surface 142 of the work surface 12. Further rotation of the screw member 110 causes the work surface 12 to become clamped between the bottom surface 52 of the base 16 and the clamping surface 146 of the clamping member 112. The bottom surface 52 of the base 16 is defined at least in part by the suction member 50.

The clamp assembly 100, when in the actuated condition, helps mount the appliance 10 to the work surface 12. The tab 120, positioned in the opening 130, and the shoulder surfaces 122, positioned against the support member 32, help fix the position of the bracket 102 relative to the base 16. This, in turn, may help to prevent unwanted movement of the base 16 relative to the work surface 12, such as sliding or twisting movement. Also, the support member 108 may be positioned flat against an end surface 144 of the work surface 12, which may also help prevent unwanted movement of the base 16 relative to the work surface. Additionally, the clamping assembly 100 can be used to help hold the annular portion 68 against the mounting surface during actuation of the suction assembly 48. Similarly, the suction assembly 48 can be actuated to urge the base 16 toward the work surface 12, such that actuation of the clamping assembly is facilitated.

From the above description of the invention, those skilled in the art will perceive improvements, changes and modifications in the invention. For example, in the example embodiment, the clamp assembly 100 is actuatable via the threaded screw member 110. The clamp assembly 100 could, however, be adapted for actuation by alternative means, such as a ratchet mechanism. Such improvements, changes and modifications within the skill of the art are intended to be covered by the appended claims.

Having described the invention, I claim:

1. A kitchen appliance apparatus mountable on a work surface for performing a culinary function, said apparatus comprising:

a culinary unit;

a base for supporting said culinary unit;

a suction assembly including a suction member that forms a bottom surface of said base, said suction assembly being operable to form a vacuum between said suction member and the work surface for releasably connecting said base to the work surface; and a clamp assembly comprising a clamping member having a clamping surface spaced from and presented toward said suction member, said clamping member being movable toward said suction member to clamp the work surface between said clamping member and said suction member; said clamp assembly further comprising a bracket having a generally C-shaped configuration, said bracket including spaced upper and lower bracket members, said base being adapted to receive at least a portion of said upper bracket member; and means for urging said clamping member toward said suction member to clamp the work surface between said clamping member and said suction member, said means for urging said clamping member being associated with said lower bracket member;

wherein said base comprises a support member, said support member having a first end extending from a top surface of said base opposite said bottom surface, said support member having a second end opposite said first end connected with said culinary unit, an opening located near said first end of said support member being adapted to receive a portion of said upper bracket member to help support said bracket on said base and prevent movement of said bracket relative to said base;

wherein said upper bracket member has a narrowed portion forming a tab at a terminal end of said upper bracket member, said tab having a width that is narrower than a width of said upper bracket member, said opening having a width sufficient to permit insertion of said tab therein, said support member having portions on opposite sides of said opening that engage shoulder portions of said bracket member on opposite sides of said tab, said tab cooperating with said opening and said shoulder portions cooperating with said portions of said support member to help prevent movement of said bracket relative to said base.

2. The apparatus recited in claim 1, wherein said means for urging said clamping member comprises a screw member associated with said lower bracket member, said screw member having a first end operatively connected with said clamping member and an opposite second end comprising a gripping portion for imparting rotational movement of said screw member about an axis, said screw member when rotated about said axis urging said clamping member toward said suction member to clamp the work surface between said clamping member and said suction member.

3. The apparatus recited in claim 1, wherein said base comprises a rim portion defining a recess in said base, said suction member comprising a flexible sheet of material, said suction member having a peripheral portion extending along said rim portion and a central portion covering said recess, said apparatus further comprising an actuator assembly actuatable to urge said central portion of said suction member into said recess.

4. The apparatus recited in claim 3, wherein said actuator assembly comprises:

a lift member operatively connected with said central portion of said suction member;

a lift rod having a first end connected with said lift member, said lift rod extending into said recess in said base and through an aperture in an upper surface of said base; and an actuator having a cam portion and a lever portion, said cam portion being connected with a second end of said lift rod protruding through said aperture in said upper surface, said lever portion being manually operable to impart pivotal movement of said cam portion relative to said base, said cam portion being adapted to impart movement of said central portion of said suction member into said recess upon pivotal movement of said cam portion.

5. The apparatus recited in claim 1, wherein said culinary unit comprises a unit for juicing and straining tomatoes.

6. A kitchen appliance apparatus mountable on a work surface for performing a culinary function, said apparatus comprising:

a culinary unit;

a base comprising a top wall and a downwardly extending side wall, the side wall and top wall defining a vacuum chamber;

an upwardly extending support arm having a lower end connected to the top wall and an opposite upper end connected to the culinary unit;

a suction member that extends across the side wall and closes the vacuum chamber;

a suction mechanism for drawing the suction member into the vacuum chamber to form a vacuum between the suction member and the work surface to releasably connect the base to the work surface; and a clamp assembly comprising a generally C-shaped bracket having an upper bracket member, a lower bracket member that extends generally parallel to the upper bracket member, and a support member that extends between and connects the upper and lower bracket members, the upper bracket member being positionable against the top wall of the base and having a terminal end portion comprising a narrowed tab insertable in an aperture in the support arm and shoulder portions adjacent the tab that engage portions of the support arm adjacent the aperture, the clamp assembly further comprising a clamping member having a threaded connection with the lower bracket member, the clamping member having a clamping surface spaced from and presented toward the base, the clamping member being rotatable to move the clamping surface toward the base to clamp the work surface between the clamping member and the base.

* * * * *